UNITED STATES PATENT OFFICE.

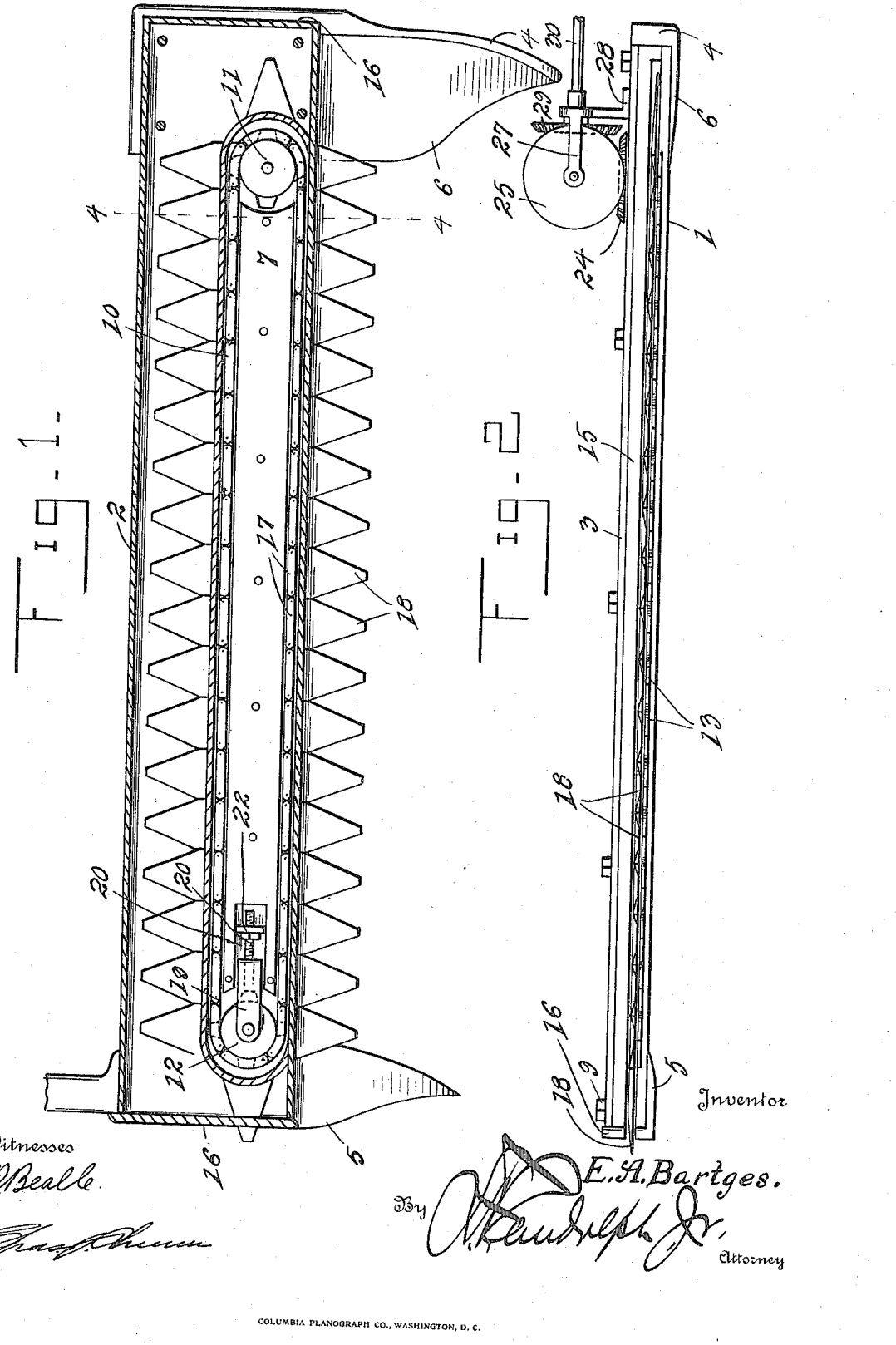

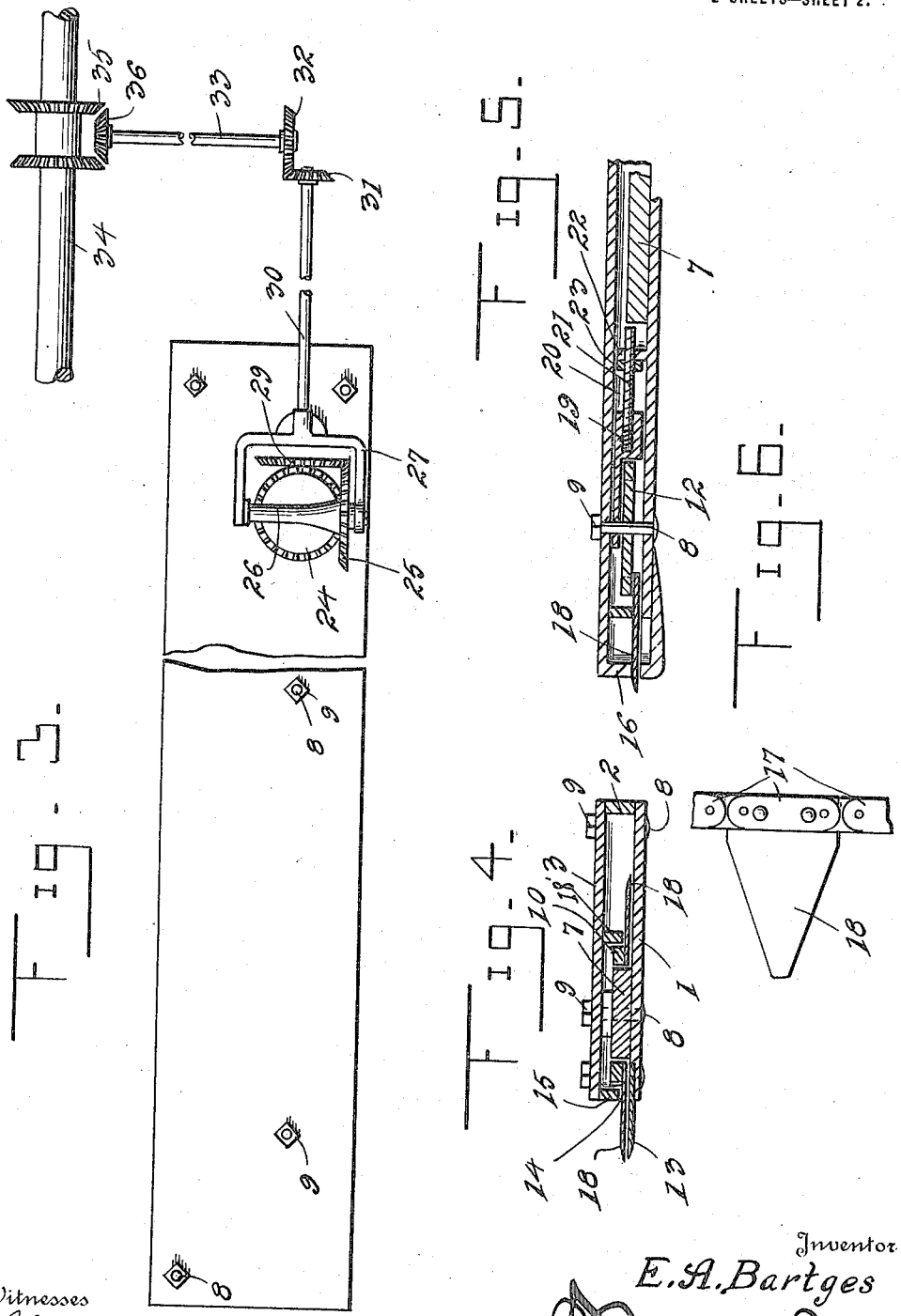

ERVIN A. BARTGES, OF COBURN, PENNSYLVANIA.

CUTTER-BAR.

1,145,739. Specification of Letters Patent. Patented July 6, 1915.

Application filed September 8, 1913. Serial No. 788,658.

*To all whom it may concern:*

Be it known that I, ERVIN A. BARTGES, a citizen of the United States, residing at Coburn, in the county of Center and State of Pennsylvania, have invented certain new and useful Improvements in Cutter-Bars; and I do hereby declare the following to be a full, clear, and exact description of the invention, such as will enable others skilled in the art to which it appertains to make and use the same.

My invention relates to new and useful improvements in cutter bars for mowing machines and the like, and has for its object the provision of a rotary cutter operatively connected with some revolving part of the mowing machine, etc.

An object of importance is to provide a device of the above mentioned character, which consists of a chain carrying a plurality of cutting knives adapted to co-act in their cutting operation with a plurality of fixed knives carried by the cutter bar, thus efficiently providing the desired cutting action in a more reliable and expeditious manner than has heretofore been the practice.

A further object is to provide means for housing the rotary cutter, that is so arranged and constructed to protect the rotary cutter in the best possible manner.

A further object of importance is to provide novel means for taking up the slack on the chain carrying the cutting knives, that is operatively connected with one of the sprocket wheels for operating the chain.

A still further object is to provide a device such as described, which is constructed of few parts, simple, reliable and efficient in its operation, and cheap to manufacture.

The above and additional objects are accomplished by such means as are illustrated in the accompanying drawings described in the following specification and then more particularly pointed out in the claim which is appended hereto and forms part of this application.

With reference to the drawings, wherein, I have illustrated the preferred embodiment of my invention as it is reduced to practice, and throughout the several views of which, similar reference numerals designate corresponding parts: Figure 1 is a top plan view of my entire device illustrating a portion of the casing therefor in sections, Fig. 2 is a front elevation illustrating a part of the mechanism for operating the rotary cutter, Fig. 3 is a top plan view illustrating the mechanism for rotating the cutter, Fig. 4 is a cross sectional view taken on line 4—4 of Fig. 1, Fig. 5 is a longitudinal section particularly illustrating the means for governing the tension of the chain forming a part of the rotary cutter, and Fig. 6 is a detail view illustrating the manner of securing the cutting knives to the links of the chain.

Referring to the drawings the numeral 1 designates a longitudinal plate forming the bottom wall of the casing for the rotary cutter and a part of the cutter bar. The rear wall 2 connects the rectangular plate 1 with a similarly constructed plate 3, that forms the upper wall of the casing. This casing is suitably secured to the mowing machine and carries at its terminals a pair of outwardly extending guide members 4 and 5, that are adapted to engage the grass, etc., to be cut and force it into engagement with the cutter, which will be hereinafter more fully described. These members 4 and 5 are bolted or otherwise suitably secured to the under side of the casing and are each provided with concave cutting edges 6. Mounted within the casing and toward the forward edge thereof is a rectangular plate 7, that is secured in the position above named by means of bolts 8, that are inserted through the plates 1 and 3 of the casing and plate 7, and held against removal by means of the nuts 9.

A link chain designated 10 as an entirety is mounted upon sprocket wheels 11 and 12 that are journaled horizontally within the casing between the plates 1 and 3 thereof and adjacent each terminal thereof. The chain 10 is mounted for rotation upon the sprocket wheels 11 and 12 and is spaced by means of the plate 7, thus assuring the proper alinement of the gears carried by the chain with respect to the fixed gears carried by the plate 1, both of which will be hereinafter more fully described.

A plurality of cutting knives 13, preferably V shaped, are bolted, or otherwise suitably secured to the forward edge of the plate 1, in such a manner as to dispose the upper surface thereof in flush relation with the upper surface of the plate 1. These fixed knives 13, extend downwardly from the plate 1 through an opening 14, that is formed between the downwardly extending flange 15 carried by the forward terminal of the plate 3 and the plate 1. This opening 14 extends through one of the end walls 16 of the casing for a distance sufficient to allow the rotary cutting knives to pass therethrough and into the casing. The sprocket wheel 11 at the inner end of the casing is sufficiently spaced from the inner end wall 16 to permit the rotary cutting knives to pass through the opening 14 in spaced relation to the inner end wall 16. Each of the links 17 of the chain has bolted upon its under face a cutting knife 18, similar in shape to the fixed cutting knives 13. It is thus apparent that the cutting knives 18 carried by each of the links 17 of the chain are held in the proper position relative to the fixed cutting knives 13 by means of the plate 7, mounted upon the bottom plate 1 of the casing, and which serves to properly space the chain which bears thereagainst and thus provides the desired action.

A longitudinal guide plate 18' is carried by the upper plate 3 and terminates in spaced relation to the bottom plate 1. The longitudinal guide 18' is so disposed that the cutting knives 18 will pass between the lower terminal thereof and the bottom plate 1, thus preventing upward movement of the cutting knives at the point of their engagement with the guide. The longitudinal guide 18' is curved at its ends outwardly toward the front edge of the device so as to conform to the curve of the chain. The ends of the guide engage the inner face of the flange 15 and said guide is disposed with its lower edge in the same plane as the lower edge of the flange 15.

The sprocket wheel 12 is journaled in a bearing 19 that is slidably mounted within a rectangular opening 20, formed in the adjacent terminal of the plate 7. This bearing 19 is supported by a screw 21, that is threaded through an upstanding ear 22, formed on the bottom plate 1 and extending between the sides of the opening 20. One terminal of the screw 21 is threaded in the bearing 19 and the screw is adjustable by means of a nut 23 mounted thereupon. The bearing 19 and means for adjusting the same provide for the governing of the tension of the chain carrying the cutting knives 18.

As a means for rotating the chain 10 there has been provided a beveled gear 24, mounted upon the outer side of the top plate 3 upon the bearing upon which the sprocket wheel 11 is mounted. This beveled gear 24 meshes with a vertically disposed beveled gear 25, that is journaled upon a shaft 26. This shaft 26 is mounted transversely upon a U shaped supporting bracket 27, that is secured as at 28 to the top plate 3. A beveled gear 29 is journaled upon a shaft 30 within the supporting bracket 27 and meshes with the beveled gear 25. A beveled gear 31 is keyed upon the shaft 30 and meshes with a beveled gear 32, that is similarly keyed upon a shaft 33. This shaft 33 is operatively connected with a rotating shaft 34, carried by the mowing machine, by means of the gears 35 and 36. It is thus apparent that a rotary motion is transmitted to the chain 10 through the medium of the gears, hereinbefore described, and that the cutting operation is therefore provided. Suitable means, not shown, may be employed for disconnecting certain of the gears and for operating the cutter, so that the cutter may be operated, or not, as desired.

It will thus be seen that a rotary cutter is provided that will efficiently perform all the functions hereinbefore cited.

In reduction to practice I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus described my invention, I claim:

A cutter bar comprising a casing having a longitudinal opening in one wall thereof, a depending guide plate carried by the top wall of the casing and disposed within the casing with its lower edge in the same plane as the upper edge of the opening in the front wall, said guide plate extending for the better part of its length in spaced longitudinal relation to the front wall of the casing and having its ends curved outwardly and inwardly and disposed in engagement with the front wall of the casing and having its ends curved outwardly and inwardly and disposed in engagement with the front wall of the casing, an endless flexible knife supporting member rotatably mounted within the casing and disposed between the guide and front wall of the casing and knife blades carried by the flexible knife supporting member and arranged to extend through the opening in the front wall, said guide engaging the upper faces of all of the blades that are disposed within the casing.

In testimony whereof I affix my signature in presence of two witnesses.

ERVIN A. BARTGES.

Witnesses:
JOHN L. HOLMES,
CORA E. BARTGES.

Copies of this patent may be obtained for five cents each, by addressing the "Commissioner of Patents, Washington, D. C."